(12) United States Patent
Williams et al.

(10) Patent No.: US 11,625,725 B1
(45) Date of Patent: Apr. 11, 2023

(54) STATELESS SECURE PAYMENT SYSTEM

(71) Applicant: AMAZON TECHNOLOGIES, INC., Seattle, WA (US)

(72) Inventors: Jordan Tyler Williams, Seattle, WA (US); Sarath Geethakumar, Bellevue, WA (US); Aneeta Bhattacharyya, Seattle, WA (US); Tamer Avci, Seattle, WA (US); Venkatraman Srinivasan, Redmond, WA (US); Sanjay Kumar Dash, Mercer Island, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 204 days.

(21) Appl. No.: 16/181,160

(22) Filed: Nov. 5, 2018

Related U.S. Application Data

(60) Provisional application No. 62/716,573, filed on Aug. 9, 2018.

(51) Int. Cl.
*G06Q 20/40* (2012.01)
*H04L 29/06* (2006.01)
(Continued)

(52) U.S. Cl.
CPC ......... *G06Q 20/409* (2013.01); *G06Q 20/352* (2013.01); *G06Q 20/3825* (2013.01);
(Continued)

(58) Field of Classification Search
None
See application file for complete search history.

(56) References Cited

U.S. PATENT DOCUMENTS 7,949,568 B2   5/2011   Fano et al.
8,630,924 B2   1/2014   Groenevelt et al.
(Continued)

FOREIGN PATENT DOCUMENTS

WO   WO-2017160877 A1 *   9/2017   ......... G06Q 20/3829

OTHER PUBLICATIONS

EMVCo, LLC., "EMV ContactlessSpecifications for Payment Systems", EMV Book C-3, Kernel 3 Specification, Version 2.6, Feb. 2016, 164 pages. Retrieved from the Internet: https://www.emvco.com/wp-content/uploads/2017/05/C-3_Kernel_3_v2.6_20160512101602517.pdf.
(Continued)

*Primary Examiner* — Jamie R Kucab
(74) *Attorney, Agent, or Firm* — Lindauer Law, PLLC

(57) ABSTRACT

A biometric input device is used to obtain biometric data from a user. The biometric data is used to determine host card emulation (HCE) parameters that are associated with the user and are used to access a payment account. An interface device that is associated with the biometric input device receives the HCE parameters. The interface device includes a secure execution environment (SEE). A processor in the SEE decrypts and stores the HCE parameters in the memory of the SEE and executes an HCE instance. The HCE instance uses a communication interface to interact with a payment terminal using a contactless communication protocol. The interaction provides payment data to the payment terminal, which is then sent along a payment channel for processing. The HCE instance is then erased, and the SEE is then available for use by another user for another transaction using a different payment account.

21 Claims, 6 Drawing Sheets

(51) Int. Cl.
*H04L 9/40* (2022.01)
*H04L 9/32* (2006.01)
*G06Q 20/34* (2012.01)
*G06Q 20/38* (2012.01)

(52) U.S. Cl.
CPC ... *G06Q 20/3829* (2013.01); *G06Q 20/40145* (2013.01); *H04L 9/3231* (2013.01); *H04L 63/0861* (2013.01); *G06Q 2220/00* (2013.01)

(56) References Cited

U.S. PATENT DOCUMENTS

| | | | |
|---|---|---|---|
| 2013/0284806 A1 | 10/2013 | Margalit | |
| 2013/0331029 A1* | 12/2013 | Tang | H04W 4/60 455/41.1 |
| 2014/0040873 A1* | 2/2014 | Goldman | G06F 8/65 717/168 |
| 2016/0054989 A1* | 2/2016 | Diebolt | H04L 9/3247 717/177 |
| 2016/0057619 A1* | 2/2016 | Lopez | G06F 21/44 380/247 |
| 2016/0127857 A1* | 5/2016 | O'Donoghue | H04B 5/0031 455/41.1 |
| 2016/0253651 A1* | 9/2016 | Park | G06Q 20/34 705/39 |
| 2017/0103237 A1* | 4/2017 | Roehrle | G06K 7/10297 |
| 2018/0005227 A1* | 1/2018 | Sandelov | G06Q 20/3415 |
| 2018/0067777 A1* | 3/2018 | Wang | G06F 9/445 |
| 2018/0324584 A1* | 11/2018 | Lopez | G06F 21/606 |
| 2018/0367315 A1* | 12/2018 | Chen | G06F 21/51 |
| 2019/0354980 A1* | 11/2019 | Li | G06Q 20/36 |

OTHER PUBLICATIONS

Kinetis K8X MCU Family, "Kinetis Software Development Kit (SDK)", NXP Semiconductors Netherlands B.V., KNTSK8XFS Rev. 5, 3 pages. Retrieved from the Internet: https://www.nxp.com/docs/en/fact-sheet/KNTSK8XFS.pdf.

Mohammed, et al., "Host Card Emulation (HCE)", Smart Card Alliance Mobile and NFC Council, Jun. 18, 2015, 35 pages. Retrieved from the Internet: https://www.securetechalliance.org/downloads/HCE_Webinar_FINAL_061815.pdf.

NXP Semiconductors, "Point of Sale (POS) Reader Solution", NXP Semiconductors Netherlands B.V., POSREADERLF REV 4, May 4, 2018, 3 pages. Retrieved from the Internet: https://www.nxp.com/support/developer-resources/nxp-designs/point-of-sale-pos-reader-solution:SLN-POS-RDR.

Smartcard Alliance, et al., "Host Card Emulation (HCE) 101", A Smart Card Alliance Mobile and NFC Council White Paper, Publication No. MNFCC-14002, Aug. 2014, 32 pages. Retrieved from the Internet: https://www.securetechalliance.org/wp-content/uploads/HCE-101-WP-FINAL-081114-clean.pdf.

Van Den Breekel, et al., "EMV in a Nutshell", KPMG, IBM Research Zurich, Radboud University Nijmegen, Jun. 29, 2016.

* cited by examiner

STATELESS SECURE PAYMENT SYSTEM

PRIORITY

This application claims priority to U.S. Patent Application Ser. No. 62/716,573 filed on Aug. 9, 2018, titled "STATELESS SECURE PAYMENT SYSTEM", the contents of which are incorporated by reference into the present disclosure.

BACKGROUND

Facilities such as stores, offices, and so forth, may need the ability to accept payment from users.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
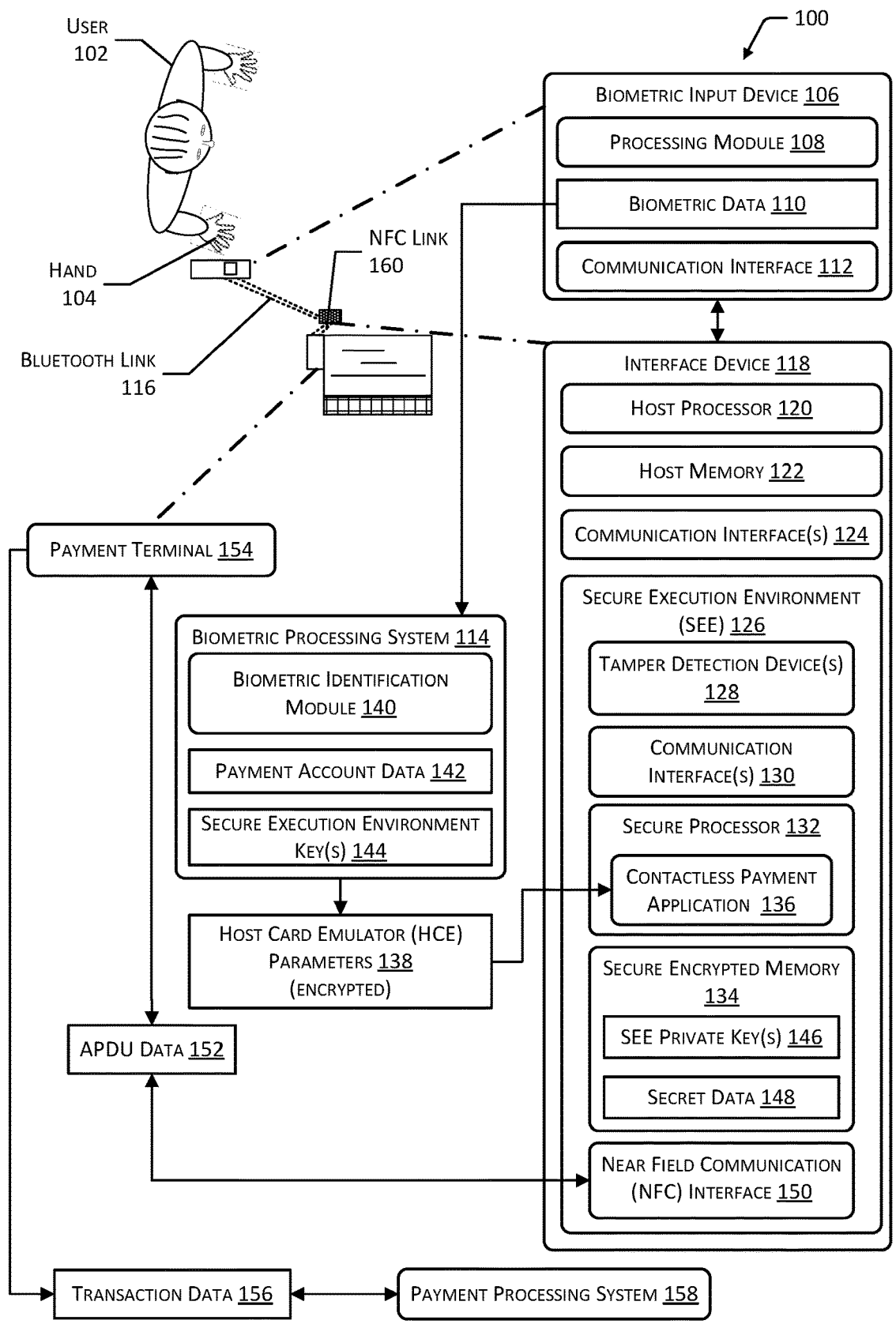
FIG. 1 illustrates a stateless secure payment system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Electronic payment mechanisms, such as debit cards, credit cards, stored value cards, gift cards, and so forth provide significant convenience in facilitating a transfer of value between parties. For example, a user may pay for goods and services using a credit card instead of having to carry cash.

Existing electronic payment mechanisms typically have the user carrying a physical device such as a card, smartphone, fob, and so forth. To perform a payment, the user presents that physical device to a payment terminal. For example, the user may swipe a credit card that includes a magnetic stripe, insert a card with electrical contacts into a reader, place a contactless card proximate to a wireless interface, and so forth.

By way of illustration, and not necessarily as a limitation, the contactless card may be an EMV device that is compliant with at least a portion of the ISO/IEC 14443 as promulgated by the International Organization for Standardization (ISO) and the International Electrotechnical Commission (IEC, EMVCo, and so forth). In other implementations other standards for wireless data transfer may be utilized. The contactless card may communicate with the payment terminal wirelessly. For example, the contactless card may use a near field communication (NFC) interface. The NFC interface may include a radio transmitter, radio receiver, and so forth.

To provide the various functions associated with electronic payment, conventional devices may implement a secure execution environment (SEE) or a host card emulation (HCE). The SEE may comprise a microcontroller unit (MCU) that includes a dedicated processor, secure encrypted memory, anti-tamper features, and so forth. During an interaction, the SEE provides commands and responses to a payment terminal. For example, the SEE may use a communication interface such as an NFC transceiver to establish an NFC link and perform a transaction with the payment terminal. The SEE is distinct from a host processor that provides general computing functionality for user applications, graphic processors that generate images for display, and so forth. For example, the SEE may comprise a Kinetis K81 MCU from NXP Semiconductors N.V. of Eindhoven, Netherlands.

During manufacture, the SEE may be provisioned with secret information. For example, a device key such as an asymmetric RSA private key may be stored within the secure encrypted memory. Continuing the example, the corresponding public key may be stored by an external system, such as described below for use in sending encrypted data to the SEE. During manufacture, digitally signed applications such as described below may be stored in the secure memory and provisioned for execution on the processor of the SEE.

During operation, the SEE traditionally stores state data that is used to secure the interaction. For example, the SEE in a traditional card may store cryptographic keys, value of an application transaction counter (ATC), and so forth.

In comparison to the SEE, the HCE emulation comprises software executing on a physical device to emulate a card and provide the necessary commands and responses to a payment terminal. For example, the HCE allows a device with the SEE hardware to operate as if it had an SEE and participate in a payment interaction with the payment terminal.

Use of the HCE does introduce the potential for compromise. For example, payment tokens, cryptographic keys, and other information may be present in the host processor's memory in cleartext. As a result, use of the HCE may increase the chance of secret data being compromised.

Both the HCE and the SEE have traditionally required the user to carry the physical device with them to be able to make a payment. For example, the user would either have to carry a payment card with an SEE or their smartphone running the HCE in order to make an electronic payment.

However, these physical devices may be damaged, lost, stolen, or otherwise be unavailable. For example, a user may choose to not carry a credit card. In such a situation, with conventional electronic payment mechanisms, the user would be unable to buy goods, services, or otherwise perform a transfer of value.

Described in this disclosure is a system and techniques that allow for a user to initiate a payment transaction without carrying a physical device and using biometric data. A biometric input device obtains biometric data from a user. For example, the user may present a hand to a palmprint scanner, a finger to a fingerprint scanner, have an image of their iris obtained, and so forth.

The biometric input device provides the biometric data to a biometric identification system. For example, the biometric input device may include a wireless network interface that is used to provide connectivity to the Internet. The biometric input device sends biometric data to a biometric processing system that processes the biometric data. For example, the biometric processing system may use biometric data to retrieve HCE parameters. The HCE parameters may be associated with a particular type of payment, such as a credit card account. The HCE parameters may include the parameters that are used to configure an HCE device to perform an interaction with a payment terminal. For example, the HCE parameters may include data used to "personalize" the HCE and setup a particular payment account for use by an HCE.

The biometric input device is paired with, or includes, an interface device. This pairing may include the exchange of cryptographic keys to facilitate encryption of the communication between the biometric input device and the interface device.

The interface device may comprise a first communication interface to communicate with the biometric input device, an SEE, and a second communication interface suitable for communication with the payment terminal. For example, the first communication interface of the interface device may comprise a Bluetooth wireless interface that is used to communicate with the biometric input device. The biometric input device may provide the interface device with connectivity to the Internet or other networks. The second communication interface may comprise an NFC interface.

An antenna of the second communication interface of the interface device may be placed proximate to the antenna of an existing payment terminal. For example, the antenna may be placed within a few inches of the payment terminal to allow for NFC communication between the interface device and the payment terminal.

During operation of the system, the biometric input device obtains the biometric data associated with a user. The biometric data is sent to the biometric processing system which uses this data to retrieve HCE parameters associated with that user. The HCE parameters are encrypted using a cryptographic key that is associated with the SEE of the interface device that is connected to the biometric input device that sent the biometric data. The encrypted HCE parameters are sent to the interface device. In another implementation, the encrypted HCE parameters may be sent to the biometric input device, which then sends the encrypted HCE parameters to the interface device.

The interface device receives the HCE parameters and transfers at least a portion of the data to the SEE. Within the SEE, the HCE parameters are decrypted using a private key that is stored within the secure encrypted memory of the SEE. The decrypted HCE parameters, safely stored within the SEE, are then used by a contactless payment application to personalize a host card emulation that executes on the secure processor of the SEE. Personalization may comprise configuring the contactless payment application with one or more of the HCE parameters. For example, personalization may comprise storing an application primary account number, cardholder name, and so forth in memory for use by the contactless payment application. In some implementations, personalization may comprise decrypting, validating, testing, or otherwise processing one or more of the HCE parameters.

Once personalized using the HCE parameters that are associated with the user, the contactless payment application uses the second communication interface to interact with the payment terminal. For example, the payment terminal operates as it normally would, such as when interacting with a card or smartphone running an HCE. Continuing the example, the payment terminal may exchange application protocol data unit (APDU) commands with the contactless payment application that is executing within the SEE. When the interaction is complete, the contactless payment application is depersonalized, erasing the HCE parameters. The SEE may be configured to not maintain state information between instantiations of the contactless payment application. Meanwhile, the payment terminal receives the data associated with the contactless transaction and proceeds to handle the transaction accordingly.

In one implementation, the contactless payment application may be an application that is digitally signed to execute on the processor of the SEE. At the conclusion of, or in the event of a failure of, the interaction, the instance of the application is depersonalized to remove the HCE parameters. For example, the transaction may be deemed to be complete when the interaction is successful or in the event of an unsuccessful interaction. Continuing the example, upon completion the encrypted data and the one or more HCE parameters may be erased. In another implementation, the contactless payment application may be erased or otherwise rendered unusable. Upon receipt of HCE parameters at a later time, if already instantiated the contactless payment application may be personalized with the HCE parameters, or if not already instantiated a new instance is instantiated with the received HCE parameters.

By using the system as described, a user is able to provide for a transfer of value without being required to carry a physical device. For a brief time during the interaction, the interface device is personalized with HCE settings associated with the user who provided the biometric data. This allows the interface device to operate as if it were the physical device that the user would otherwise be required to carry.

In some implementations, the biometric input device, the interface device, the payment terminal, or another device may provide the user with a user interface that allows for selection or designation of a particular payment method. For example, the user may be able to select a credit card provided by an employer, a first personal credit card, a first personal debit card, and so forth on a touchscreen of the biometric input device. In another example, the user may select from categories such as "work" or "personal" which then result in the use of the payment method that has been previously designated for that category.

In another implementation, instead of using the biometric input device, the user may enter a pin, password, passcode, or other input data into an input device. The input device may be part of the secure execution environment. The input data may be processed to determine the payment account data which may then be used as described in this disclosure.

The existing payment infrastructure that supports electronic payment mechanisms is extremely complicated and involves many participants. The system described herein may be integrated into this system with little or no disruption to existing operations. For example, a merchant may install the biometric input device and the interface device alongside an existing system that includes a payment terminal which already supports contactless payment. Existing physical devices such as contactless cards or HCEs running on smartphones or other devices may continue to be used, but with the added functionality and convenience of a user being able to pay without having that physical device.

The system described herein offers several improvements over existing systems. Users are able to perform a payment transaction without having to present a physical device. Instead, they are able to use a biometric feature or attribute. Security, latency, and availability of the system is improved as the biometric input device may provide the biometric data to the biometric processing system and receive the HCE parameters from the biometric processing system without involving other systems or services maintained by other parties.

In one implementation, an EMV cryptogram may be generated locally in the SEE of the interface device. This eliminates additional latency due to a network round trip time that is involved in a conventional HCE interaction in which a remote server computes the cryptogram.

Security of the HCE parameters is enhanced by encrypting this data using the key associated with the particular interface device, and SEE therein, used in the transaction. The system provides for per-transaction, on-demand provisioning of the customer payment data with low latency and without the need to invoke other systems.

Security of the HCE parameters and resulting data is also maintained by limiting that data to processing within the SEE. While other systems may either use an SEE or an HCE running on a host processor, the system as described utilizes an HCE executing on a processor within the SEE. As a result, during the brief time in which the HCE parameters and associated information are stored in the secure encrypted memory of the SEE, that data remains safeguarded within the SEE. The additional security prevents the EMV key, tokenized account number, or other secret information from being present in cleartext in the main host processor memory during a transaction.

FIG. 1 illustrates a stateless secure payment system 100, according to some implementations. A user 102 provides biometric input, such as presenting a hand 104 to a biometric input device 106. The biometric input device 106 may include one or more sensors such as a palm print reader, fingerprint scanner, iris scanner, camera, and so forth. The biometric input device 106 includes a processing module 108 that uses input from the sensors to produce biometric data 110. For example, the biometric data 110 may comprise image data, feature vectors, and so forth. The biometric input device 106 may use a communication interface 112 to send the biometric data 110 to a biometric processing system 114. For example, the biometric processing system 114 may comprise one or more servers at another location. The communication interface 112 may connect to a local area network which in turn connects to a wide area network, such as the Internet.

The biometric input device 106 may include or be in communication with an interface device 118. The interface device 118 may include a host processor 120. For example, the host processor 120 may execute an operating system, user applications, and so forth. A host memory 122 comprises one or more computer-readable storage media (CRSM) that may store data, instructions, and so forth.

A communication interface 124 provides communication between the interface device 118 and the biometric input device 106. For example, the communication interface 124 may provide a wired connection such as a universal serial bus (USB) connection, a wireless connection such as a Bluetooth link 116 using a Bluetooth interface, and so forth.

The interface device 118 includes a secure execution environment 126 (SEE). The secure execution environment 126 may include one or more tamper detection devices 128 or antitamper features, a communication interface 130, a secure processor 132, a secure encrypted memory 134, a near field communication (NFC) interface 150, and so forth. The NFC interface 150 may be used to establish an NFC link 160 with a payment terminal 154, as described below.

The tamper detection devices 128 may be configured to provide data indicative of physical or electronic tampering associated with an attempt to circumvent security features of the SEE 126. For example, the tamper detection devices 128 may comprise electrical conductors that, when broken, signal an attempt to gain physical access to an interior of the SEE 126. In another example, the tamper detection devices 128 may comprise a radiation sensor configured to detect x-ray radiation that may be used to non-invasively determine the structure of the SEE 126 hardware. In some implementations, the SEE 126 may be configured to erase data, be rendered inoperable, and so forth in the event of an actual or suspected attempt to improperly access the SEE 126 or a portion thereof.

The SEE 126 may include antitamper features. The antitamper features may be designed to render the SEE 126 inoperable in the event of actual or suspected compromise. For example, the antitamper features may be configured to destroy the contents of memory if the case of the SEE 126 is opened. In one implementation, the SEE 126 may comprise a Kinetis K81 MCU from NXP Semiconductors N.V. of Eindhoven, Netherlands. In other implementations, other devices may be used.

The communication interface 130 may be used to provide communication between the SEE 126 and other devices in the interface device 118, such as the host processor 120. For example, the communication interface 130 may comprise an I2C interface that is in communication with the communication interface 112. Communication between the SEE 126 and other devices, such as the communication interface(s) 124, may be restricted. Such restrictions may be used to increase the resistance of the SEE 126 to attack. In one implementation, the SEE 126 may be limited to responding to a predetermined set of instructions and processing data that is compliant with one or more predetermined rules. For example, the SEE 126 may implement a "mailbox" type message handling system in which messages received by the communication interface 130 are assessed with respect to the predetermined set of instructions and the one or more predetermined rules. Continuing the example, if an instruction is received that is not present in the predetermined set of instructions, that instruction may be erased or disregarded. Likewise, if data is received that fails a predetermined rule such as being incorrectly formatted or being longer than a specified value, that data may be erased or disregarded.

The secure processor 132 executes a contactless payment application 136. In one implementation, the contactless payment application 136 may be instantiated in advance of a transaction and is available for use. This implementation reduces overall latency as the contactless payment application 136 is instantiated and available for use. In this implementation, the contactless payment application 136 is personalized or configured using HCE parameters 138 provided to the SEE 126. The biometric processing system 114 may provide the HCE parameters 138 to the SEE 126. When the transaction is complete, the contactless payment application 136 may depersonalize the contactless payment application 136. For example, the HCE parameters 138, register values, counters, and so forth of the contactless payment application 136 may be erased or reset to a default value.

The HCE parameters 138 may comprise one or more data elements that are associated with a transaction. In some implementations, the data elements may be compliant with at least a portion of the EMV contactless specifications for payment systems as promulgated by EMVCo, LLC in the "EMV Contactless Specifications for Payment Systems Book C-3 Kernel 3 Specification version 2.6". For example, the HCE parameters 138 may include one or more of an application primary account number, cardholder name, application expiration date, issuer country code, application primary account number sequence number, and so forth.

In another implementation, the contactless payment application 136 may be instantiated for a particular transaction. Once instantiated, the contactless payment application 136 is personalized or configured using HCE parameters 138 provided to the SEE 126. When the transaction is complete, the contactless payment application 136 may be erased, as well as the HCE parameters 138 and other data associated with that instantiation.

The biometric processing system 114 may comprise a biometric identification module 140. The biometric identification module 140 may process the biometric data 110 to determine payment account data 142 that is associated with the user 102. The payment account data 142 may comprise data that is used to identify, authenticate, or otherwise provide a transfer of value. For example, the payment account data 142 may comprise information such as account numbers, expiration dates, verification codes, and so forth.

The biometric processing system 114 may retrieve from storage, or generate, the one or more host card emulator (HCE) parameters 138. The HCE parameters 138 may then be sent to the contactless payment application 136. For example, the payment account data 142 may be used to generate the HCE parameters 138.

To maintain secrecy, the HCE parameters 138 are encrypted before transmission to the secure execution environment 126. In one implementation, the biometric processing system 114 determines an SEE key 144 that is associated with the secure execution environment 126. The SEE key 144 may comprise a cryptographic key that is used specifically for encrypting communications with that particular secure execution environment 126. For example, the biometric data 110 may include information indicative of the particular biometric input device 106. The biometric input device 106 may digitally sign the biometric data 110, providing information as to the identity of the sending device and authenticity of the data. The biometric processing system 114 may then retrieve, based on the information indicative of the particular biometric input device 106 and the associated interface device 118, the SEE key(s) 144 which are then used to encrypt the HCE parameters 138.

During operation, the secure execution environment 126 may store SEE private key(s) 146, secret data 148, or other information within the secure encrypted memory 134. The secret data 148 may comprise one or more of the decrypted HCE parameters 138, or data derived therefrom. The SEE private key(s) 146 may comprise cryptographic private keys, symmetric keys, signature values used to validate the signature of the contactless payment application 136, and so forth. In one implementation, the SEE private keys 146 may comprise a value that is in, and unique to, the SEE 126 such as a particular bit pattern in a memory array upon startup that results due to manufacturing variations. In another implementation, the SEE private keys 146 may be stored in the secure encrypted memory 134 during manufacture. The SEE private key(s) 146 may comprise a private key value that is paired with a public key value that is known to the biometric processing system 114. In other implementations, the SEE private key(s) 146 may comprise a symmetric key that is shared with the biometric processing system 114. For example, the SEE key 144 and the SEE private key 146 may comprise the same value.

The encrypted HCE parameters 138 are received at the interface device 118 and may be passed to the SEE 126 via the communication interface 130 of the SEE 126. The encrypted HCE parameters 138 may then be decrypted by the secure processor 132 in the SEE 126, using the SEE private key(s) 146. The now decrypted HCE parameters 138 may be used to personalize the contactless payment application 136.

During operation, the contactless payment application 136 that is based on the HCE parameters 138, uses the NFC interface 150 to establish and NFC link 160 and exchange application protocol data unit (APDU) data 152 or other data with a payment terminal 154. For example, the APDU data 152 may comprise the data associated with a contactless transaction. The APDU data 152 may be compliant with at least a portion of the ISO/IEC 7816 standard.

In some implementations, the payment terminal 154 may comprise a card reader, keypad, and other devices. In some implementations, the payment terminal 154 may perform one or more point-of-sale (POS) functions. For example, the payment terminal 154 may accept input from an operator that specifies an item or service purchased, generate receipts, and so forth. During operation of the system, the payment terminal 154 interacts with the interface device 118 as if the interface device 118 was a host card emulator or NFC-capable card and may proceed to generate transaction data 156. The transaction data 156 may be sent to a payment processing system 158. For example, the payment processing system 158 may comprise a bank, payment network, clearinghouse, and so forth.

Once the contactless payment application 136 completes the interaction with the payment terminal 154, the secret data 148, the HCE parameters 138, the instantiated contactless payment application 136, and other information in the secure execution environment 126 associated with the particular instantiation may be depersonalized, removing from the secure execution environment 126 the HCE parameters 138 and other data associated with the transaction. The instantiation of the contactless payment application 136 may remain. In another implementation, the instantiation of the contactless payment application 136 may be erased or otherwise destroyed. The interaction may be deemed complete when an acknowledgement is received, upon a determination of an error condition, after a timeout period, and so forth. In one implementation, state information is not maintained from one instantiation to the next, while the depersonalized contactless payment application 136 is retained in the SEE 126. In the implementation where the instantiation of the contactless payment application 136 has been removed, a previously stored installation file(s) for the contactless payment application 136 may then be used to instantiate the next contactless payment application 136 as needed.

Figure 2:
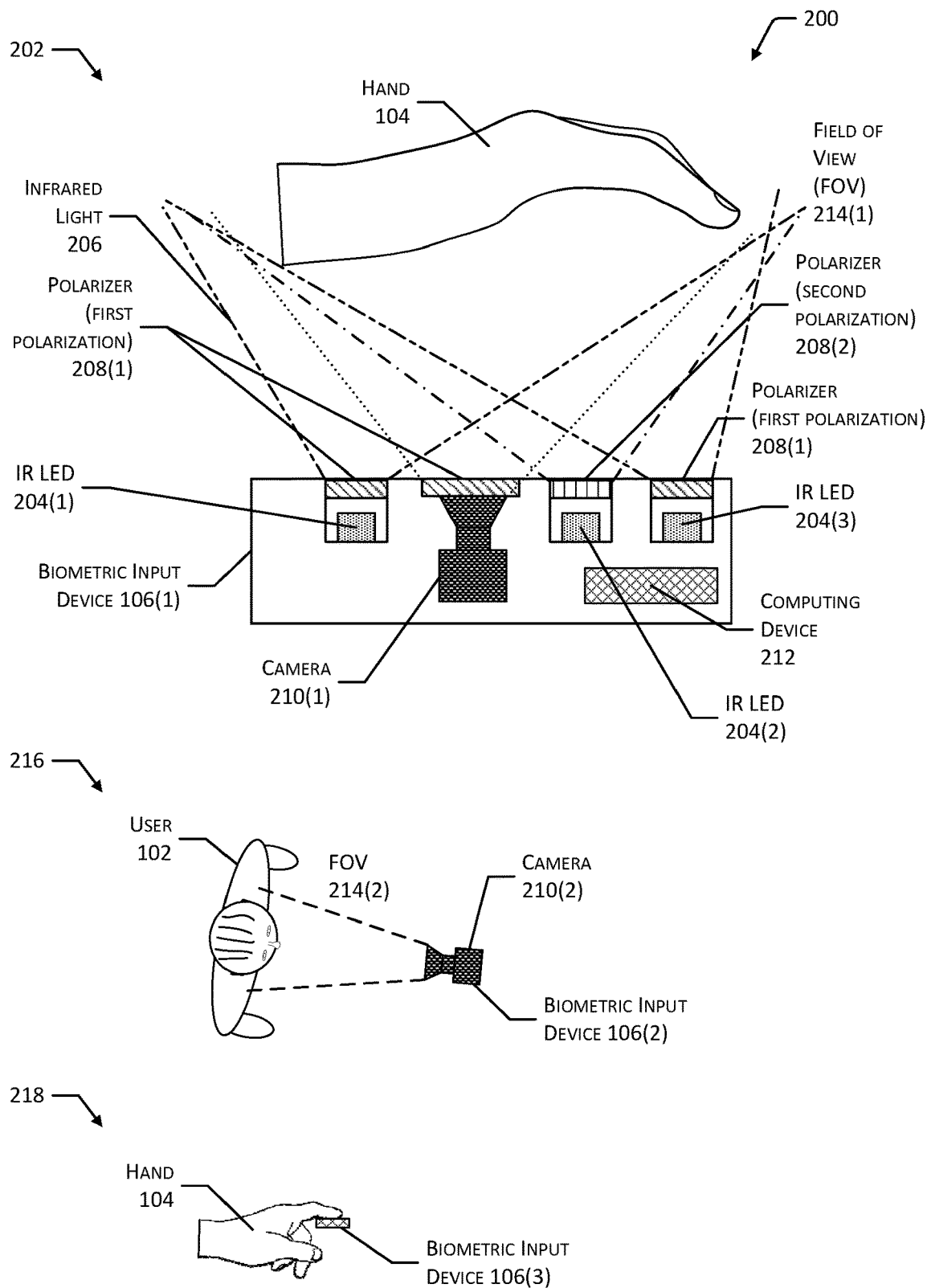
FIG. 2 illustrates biometric input devices that the stateless secure payment system may use, according to some implementations.

FIG. 2 illustrates at 200 several biometric input devices that the stateless secure payment system 100 may use, according to some implementations.

At 202 a biometric input device 106(1) is depicted that obtains images of a user's hand 104. In this illustration, the hand 104 of the user 102 is positioned above the biometric input device 106(1). The biometric input device 106(1) may include one or more infrared (IR) light sources. For example, a first set of IR light emitting diodes (LEDs) 204(1), a second set of IR LEDs 204(2), and a third set of IR LEDs 204(3) are shown. In other implementations, other devices may be used to generate infrared light 206. In some implementations, the wavelength of the IR light 206 may be between 750 and 1000 nanometers (nm).

The IR LED 204(1) is arranged adjacent to a first polarizer 208(1), such that IR light 206 produced by the IR LED 204(1) passes through the first polarizer 208(1). The IR light 206(1) that passes through the first polarizer 208(1) substantially exhibits a first polarization. Likewise, the IR LED 204(3) is arranged adjacent to a first polarizer 208(1). The biometric input device 106(1) includes a camera 210(1) that may also have a first polarizer 208(1), such that infrared light 206 captured by the camera 210(1) substantially exhibits the first polarization. In one implementation, the camera 210(1) with the first polarizer 208(1) may produce a raw first modality image when the hand 104 is illuminated by the light from the IR LED 204(1) with the first polarizer 208(1) that exhibits the first polarization.

In some implementations, a plurality of IR LEDs 204 with their respective polarizers 208 may be arranged at different locations in the biometric input device 106(1) relative to the camera 210. For example, four IR LEDs 204 with the first polarizers 208(1) may be arranged with one IR LED 204 at each corner of a square that is centered on the camera 210. In another implementation, the IR LEDs 204 and the polarizers 208 may form a ring around the camera 210. During operation, a computing device 212 or controller of the biometric input device 106(1) may operate the IR LEDs 204 individually or in groups to produce illumination that is either uniform or from particular directions at different times. For example, during acquisition of raw first modality images, the IR LEDs 204 may be controlled to be all on during acquisition of one image at a first time. At a second time selected IR LEDs 204, such as those in a particular corner of the square, may be controlled to be on during acquisiton of another image at a second time. By selectively illuminating the hand 104, external characteristics of the hand 104 such as ridges or creases may be enhanced due to shadow or other effects. For example, a controller of the biometric input device 106(1) may be configured to acquire one image using all IR LEDs 204 with the first polarization, then four images each using one of four IR LEDs 204 each at a different location with respect to the camera 210, followed by an image with the IR LED 204 that produces IR light 206 with a second polarization.

The biometric input device 106(1) includes a second IR LED 204(2) that is arranged adjacent to a second polarizer 208(2), such that the IR light 206 produced by the IR LED 204(2) passes through the second polarizer 208(2) substantially exhibits a second polarization. In one implementation, the camera 210 may produce a raw second modality image when the hand 104 is illuminated by the light from the IR LED 204(2) that exhibits the second polarization. A field of view (FOV) 214 indicates a region which is illuminated by the IR LEDs 204 and from which images from the cameras 210 may be obtained. In implementations involving multiple cameras 210, the FOV 214 is inclusive of the individual FOV 214 of each of the cameras 210. For example, the FOV 214 of each of the cameras 210 overlap.

During operation, a computing device 212 or controller of the biometric input device 106(1) may operate the IR LEDs 204 that produce IR light 206 with the different polarizations and the camera 210 to acquire images of the hand 104 as illuminated by the different polarizations of light. For example, at a first time the IR LED 204(1) may be active and the camera 210(1) acquires the raw image data. Continuing the example, at a second time the IR LED 204(1) may be inactive, the IR LED 204(2) may be active, and the camera 210(1) acquires raw image data. The raw image data may comprise a stream of raw first modality image, raw second modality image, raw first modality image, raw second modality image, and so forth.

The camera 210 comprises detectors that are responsive to at least the IR light 206 being used. The camera 210 may be able to generate imagery at various frame rates. For example, the camera 210 may be able to generate an image every 1/20 of a second or faster, having a frame rate of 20 frames per second (FPS). An integration time (or exposure time) of the cameras 210 specifies the amount of time that photons are measured by the detectors to generate a single image. As the integration time decreases, the system may be less prone to blurring due to motion of the hand 104.

In some implementations, a polarized light source may be used, and the polarizer 208 adjacent to the light source omitted. For example, a quantum dot may emit IR light 206 with a particular polarization. Likewise, in some implementations, the camera 210 may include a detector that is sensitive to, or provides information indicative of, polarization of captured light and the polarizer 208 omitted.

The polarizer 208 may comprise a filter that is substantially transmissive to light of a particular polarization, while substantially absorbing or reflecting light with another polarization. The polarization may be one or more of linear or circular. For example, the first polarization 208(1) may be linear while the second polarization 208(2) may be circular. In another example, the first polarization 208(1) may be linear with a first angle and the second polarization 208(2) may be linear with a second angle. When linear polarization is used, the first polarization 208(1) and the second polarization 208(2) may be perpendicular to one another. For example, the first polarization 208(1) may exhibit a first angle of 0 degrees with respect to a particular reference point, while the second polarization 208(2) exhibits a second angle of 90 degrees.

The polarizer 208 may comprise a dichroic material or structure that passes light with a linear polarization. For example, the polarizer 208 may comprise aligned polyvinylene chains, silver nanoparticles embedded in a transparent substrate such as glass, and so forth. In other implementations, other polarization devices may be used, including but not limited to wire-grid polarizers, beam-splitting polarizers, quarter-wave plates, liquid crystals, photoelastic modulators, and so forth. For example, the photoelastic modulator may comprise a device that is controlled by an electrical signal which drives a piezoelectric transducer to vibrate a half wave resonant bar, such as fused silica. By changing the frequency of the signal, the frequency of the vibration produced by the transducer is changed, and the polarization of light through the resonant bar may be selected.

The raw images provided by the biometric input device 106(1) may undergo processing to provide a set of images obtained using the first and second polarizations 208 that contain a hand 104, that the images are well illuminated, in focus, show the hand 104 in a particular orientation, show the hand 104 in a particular canonical pose, rectified, which hand 204 is presented (left or right), and so forth. The processed images may then be assessed to determine feature vectors. For example, a neural network may be trained to produce as output a feature vector that characterizes one or more features present in the images or a portion thereof. In some implementations, different neural networks may be used to produce the respective feature vectors for portions of second modality images and portions of first modality images. The resulting feature vectors may then be used to generate a current signature that is indicative of the features of at least a portion of the hand 104 that the user 102 has presented. For example, the feature vectors obtained from different modalities may be concatenated to produce a linear vector that is used as the current signature, or another neural network may access the feature vectors as input and produce the current signature.

Identification of the user 102 who presented the hand 104 to the biometric input device 106(1) may involve the biometric processing system 114 performing one or more comparisons to previously stored data, such as reference signatures produced from feature vectors of images obtained during an enrollment process. For example, the current signature may be compared to previously stored reference signatures. The reference signatures are associated with user identifiers. In one implementation, the identity may be determined based on the reference signature that is the closest in vector space to the current signature. In another implementation, identity may be determined by processing raw image data over time. For example, the confidence values associated with several different user identifiers may be determined, and as successive raw image data is processed confidence values above a threshold value may be used to register a vote for a particular user identifier. When a particular user identifier reaches a threshold number of votes, the identity associated with that user identifier may be deemed to be the identity of the user 102.

At 216 a biometric input device 106(2) is shown comprising a camera 210(2) that obtains an image of at least a portion of the user 102 is depicted. For example, the biometric input device 106(1) may comprise a camera 210 that obtains an image of the user's 102 face. The image may be processed to determine one or more feature vectors which may be stored to previously stored data to determine an identity of the user 102. The camera 210(2) may obtain images using one or more wavelengths of light, including but not limited to ultraviolet, visible light, or infrared. In some implementations, the biometric input device 106(2) may comprise a depth camera that is able to determine a distance from the camera 210(2) to various points on the user 102. For example, the depth camera may be used to generate a point cloud representation of the surface of the user's face that is representative of the 3D shape of the user's face.

At 218 a biometric input device 106(3) is shown comprising a fingerprint scanner. The biometric input device 106(3) is configured to acquire fingerprint data. The biometric input device 106(3) may use an optical, ultrasonic, capacitive, resistive, or other detector to obtain an image or other representation of features of a finger. For example, the biometric input device 106(3) may comprise a capacitive sensor configured to generate an image of features associated with the fingerprint of the user 102.

In other implementations, other biometric input devices 106 may be used to generate biometric data 110 about one or more features of the user 102. For example, a microphone may be used to acquire sound data representative of an utterance by the user 102. The sound data may be processed to determine an identity of the user 102. In some implementations, a combination of the sound of the voice and the utterance of a particular phrase may be used in combination to determine identity. For example, the user 102 may utter a particular phrase, and the sound and content of that utterance is used to identify the user 102.

Figure 3:
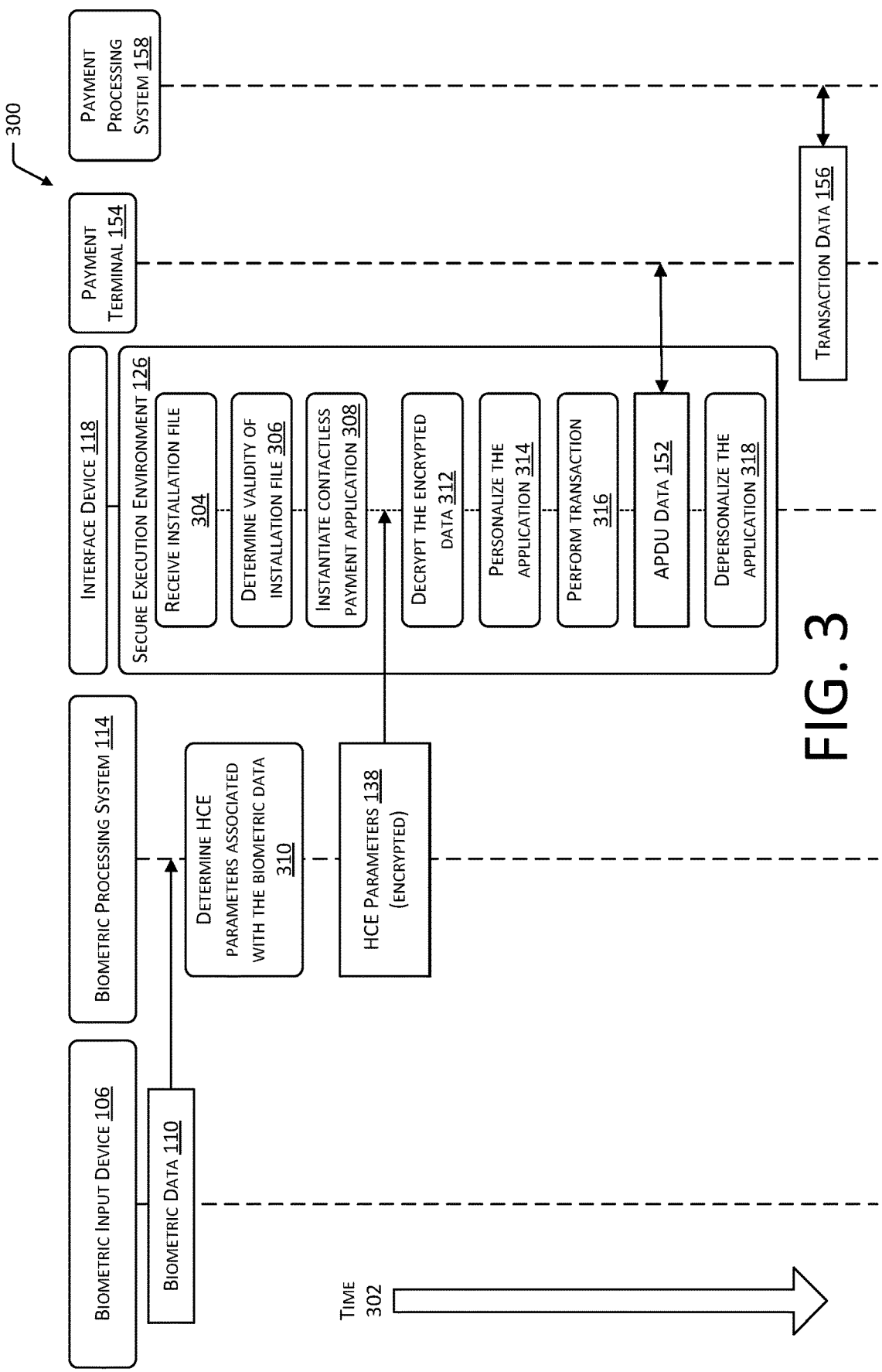
FIG. 3 is a flow diagram of a process for stateless secure payment, according to some implementations.

FIG. 3 is a flow diagram 300 of a process for stateless secure payment, according to some implementations. The process may be implemented at least in part by one or more of the biometric input device 106, the biometric processing system 114, the interface device 118, the payment terminal 154, or the payment processing system 158. In this diagram, time 302 increases from top to bottom.

The biometric input device 106 determines biometric data 110. For example, the user 102 may present their hand 104 to the biometric input device 106(1) that produces biometric data 110 indicative of one or more features of the hand 104.

The biometric data 110 is sent to the biometric processing system 114. In one implementation, the biometric data 110 may be sent from the communication interface 112 of the biometric input device 106 to the communication interface 124 of the interface device 118. The interface device 118 may then use another communication interface 124, such as a Wi-Fi network interface, to send the biometric data 110 to the biometric processing system 114. In some implementations, the biometric data 110 may be encrypted prior to transmission.

At 304 the interface device 118 receives one or more installation files. The installation file may comprise one or more instructions that, when executed by the secure processor 132, instantiate the contactless payment application 136. In some implementations, the installation file(s) may be digitally signed.

At 306 the installation file(s) may be determined to be valid. For example, the digital signature may be verified prior to instantiation. In some implementations, the digital signature may use the SEE private key 146, resulting in the installation file being considered valid only for that specific SEE 126.

In another implementation, an encrypted installation file may be received at the SEE 126. The SEE private key 146 that is stored in the secure execution environment 126 may be accessed. The secure processor 132, a cryptographic processor within the SEE 126, or other device in the SEE 126 may use the SEE private key 146 to decrypt the installation file, producing a decrypted installation file(s). The decrypted installation file may then be used to instantiate the contactless payment application 136. In some implementations, the decrypted installation file may also be digitally signed, and the digital signature may be verified prior to instantiation.

At 308 a contactless payment application 136 is instantiated. For example, the contactless payment application 136 is instantiated using the valid installation file. In some implementations, the contactless payment application 136 may be considered an empty container at this point, available to be configured using the HCE parameters 138 as described herein.

The biometric processing system 114 receives the biometric data 110. At 310 the biometric identification module 140 uses the biometric data 110 to determine the payment account data 142 that is associated with the user 102. The payment account data 142 is then used to determine the HCE parameters 138.

The biometric data 110 may include data that is indicative of the associated interface device 118. For example, the biometric data 110 may be digitally signed by the interface device 118 prior to transmission using a digital signature that is specific to the particular SEE 126 in the interface device 118. In another example, the biometric data 110 may include a serial number indicative of the interface device 118 that is in communication with the biometric input device 106.

The biometric processing system 114 determines the secure execution environment key 144 that is associated with the SEE 126 of the interface device 118. For example, the biometric processing system 114 may verify the digital signature and use the associated value, or use the serial number, to retrieve data indicative of the secure execution environment key 144 that corresponds to the SEE 126 of the interface device 118. The secure execution environment key 144 is used to encrypt the payment account data 142 that is associated with the user 102 prior to transmission to the interface device 118.

In another implementation, instead of using the biometric input device 106, the user 102 may enter a pin, password, passcode, or other input data into an input device. For example, the input device may be part of or in communication with the SEE 126. The input data, or data based on the input data, may be used to retrieve the HCE parameters 138.

At 312 the SEE 126 decrypts the encrypted HCE parameters 138 that were sent by the biometric processing system 114. For example, the secure processor 132 of the SEE 126 may use the SEE private key(s) 146 to decrypt the HCE parameters 138 which are then stored in the secure encrypted memory 134. For example, the HCE parameters 138 may include one or more of an application primary account number, cardholder name, application expiration date, issuer country code, application primary account number sequence number, and so forth.

At 314 the contactless payment application 136 is personalized using the decrypted HCE parameters 138. For example, the HCE parameters 138 may be used to set the account numbers, application transaction counter, and so forth. In some implementations, the contactless payment application 136 may be configured to only permit personalization using HCE parameters 138 that have been received via the communication interface(s) 130 that provide communication with the portion of the interface device 118 that is external to the SEE 126. For example, an attempt to provide HCE parameters 138 via the NFC interface 150 would be disregarded or deemed invalid.

At 316 a transaction is performed. The transaction may comprise the SEE 126 using the NFC interface 150 to send and receive APDU data 152 to and from the payment terminal 154. For example, the APDU data 152 may comprise one or more application protocol data unit commands that are compliant with at least a portion of the ISO/IEC 7816 standard as promulgated by the International Organization for Standardization (ISO).

At 318 the transaction is deemed to be complete and the instantiation of the contactless payment application 136 is depersonalized. For example, the secret data 148 may be erased. The secret data 148 may comprise other information, such as transaction counters or register values associated with performance of the transaction by the contactless payment application 136. The contactless payment application 136 may be configured to disregard or otherwise prevent further APDU data 152 exchange following completion of the transaction, until depersonalized and subsequently personalized. In another implementation, the contactless payment application 136 may be erased. In some implementations, erasure may comprise overwriting one or more memory locations with other values.

The payment terminal 154 may, responsive to the APDU data 152, send or receive transaction data 156 to or from the payment processing system 158. For example, the payment terminal 154 may encrypt and send data associated with the transaction to the payment processing system 158. The payment processing system 158 may then perform a transfer of value from one account to another. For example, funds may be electronically transferred from an account associated with the user 102 as specified into payment account data 142 to an account associated with a merchant or service provider.

Figure 4:
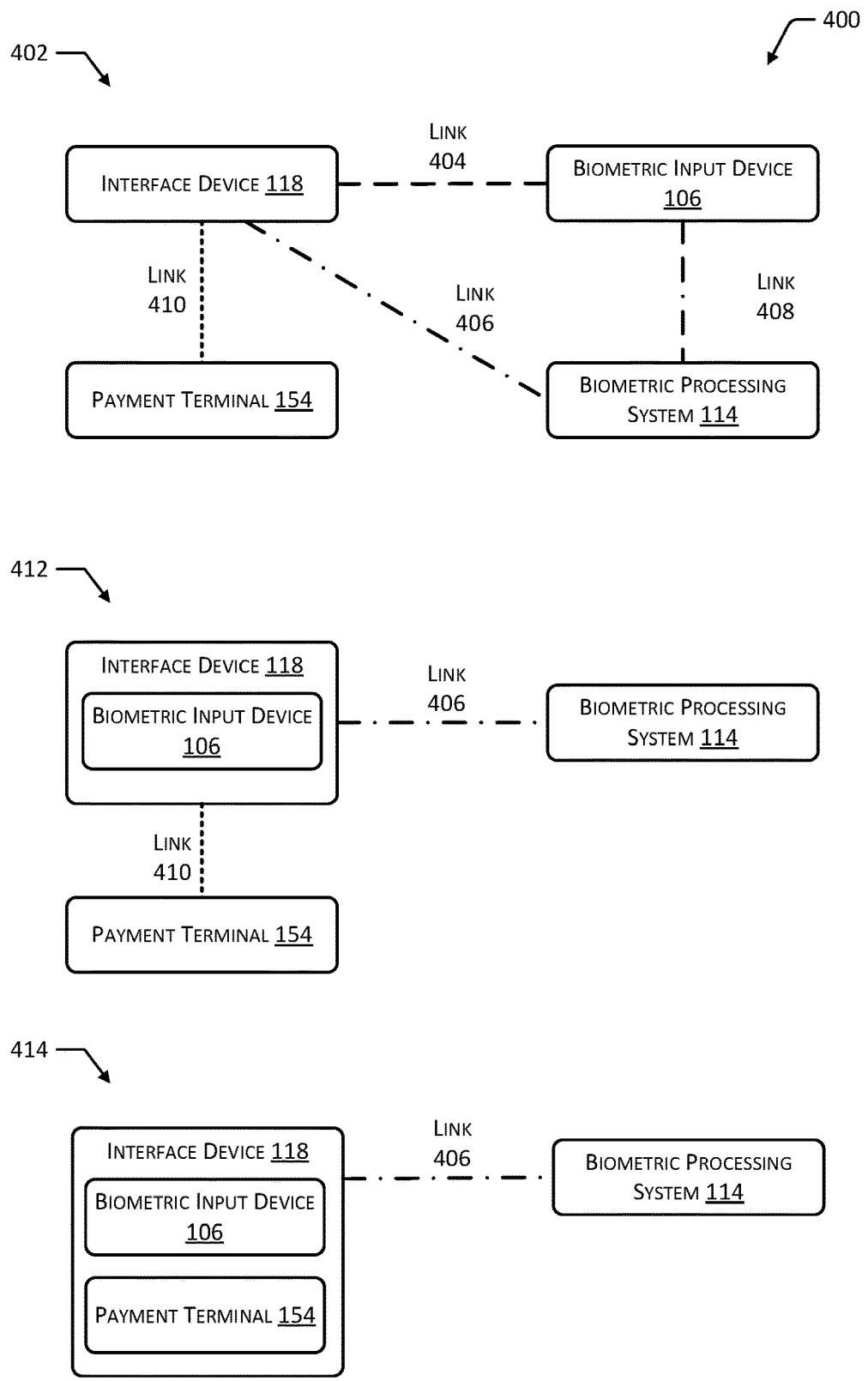
FIG. 4 is a series of block diagrams of various device configurations for the stateless secure payment system, according to some implementations.

FIG. 4 is a series of block diagrams 400 of various device configurations for the stateless secure payment system 100, according to some implementations.

In a first implementation shown at 402, the biometric input device 106, the biometric processing system 114, the interface device 118, and the payment terminal 154 are separate devices. Communication between one or more devices may be facilitated by various links. A link 404 between the biometric input device 106 and the interface device 118 may be provided by a wired USB connection. In another implementation, the link 404 may comprise a wireless Bluetooth connection. The biometric input device 106 and the interface device 118 may exchange data using the link 404. For example, the biometric input device 106 may provide the biometric data 110 to the interface device 118 using the link 404. A link 406 between the interface device 118 and the biometric processing system 114 may be facilitated at least in part by a wired Ethernet connection, wireless Wi-Fi connection, and so forth. For example, the biometric processing system 114 may be provided by one or more servers at a location that is different from the interface device 118. The interface device 118 may send the biometric data 110 to the biometric processing system 114 using a Wi-Fi network that provides connectivity to a wide area network such as the Internet. In some implementations, the biometric input device 106 may be able to communicate with the biometric processing system 114 via another link 408. For example, the biometric input device 106 may have a Wi-Fi network interface allowing it to connect to the Wi-Fi network and access the Internet to reach the biometric processing system 114.

A link 410 allows the interface device 118 to exchange information, such as the APDU data 152, with the payment terminal 154. For example, the NFC interface 150 of the SEE 126 may be used to establish the link 410 with the payment terminal 154. In another example, the link 410 may use a wired interface. For example, the link 410 may use a USB, SPI, or other connection.

The first implementation as shown at 402 may be advantageous in some circumstances. For example, a merchant may wish to add the capability to allow for payment using biometric input, without disruption to their existing point-of-sale (POS) and payment processing infrastructure, including the payment terminal 154. The biometric input device 106 may be placed near a POS terminal, with the interface device 118 arranged near an existing NFC card reading terminal. Once the biometric input device 106 and the interface device 118 have been configured, their use is transparent to the POS and the payment terminal 154. For example, the POS is used to record a purchase transaction and operates in conjunction with the payment terminal 154 to electronically transfer value associated with that transaction. To the POS and the payment terminal 154, someone appears to be presenting the payment card. To the user 102, they may only be moving their hand 104 over a biometric input device 106(1). Meanwhile, the interface device 118 and the biometric processing system 114 are retrieving the appropriate HCE parameters 138 and having the interface device 118 operate on behalf of the user 102.

A link (not shown) provides communication between the payment terminal 154 in this implementation and the payment processing system 158.

In a second implementation shown at 412, the interface device 118 and the biometric input device 106 are combined. For example, the interface device and the biometric input device 106 may be installed on a common chassis or within a single housing. The communication between the interface device 118 and the biometric input device 106 may utilize a protocol such as USB, I2C, and so forth. A link 406 provides communication between the interface device 118 with the biometric input device 106 and the biometric processing system 114. A link 410 provides communication between the interface device 118 with the biometric input device 106 and the payment terminal 154. For example, the link 410 may be wired or wireless.

A link (not shown) provides communication between the payment terminal 154 in this implementation and the payment processing system 158.

In a third implementation shown at 414, the interface device 118, the biometric input device 106, and the payment terminal 154 are combined. For example, the interface device 118 may include the biometric input device 106 and the electronics of the payment terminal 154. A link 406 provides communication between the interface device 118 with the biometric input device 106 and the biometric processing system 114. The NFC interface 150 may be omitted in this implementation, and communication between the SEE 126 and one or more elements used to perform the transaction may utilize another interface, such as USB, SPI, I2C, and so forth. In some implementations, the SEE 126 may be configured to perform one or more functions otherwise associated with the payment terminal 154. A link (not shown) provides communication between the interface device 118 in this implementation and the payment processing system 158.

In other implementations other configurations may be used.

Figure 5:
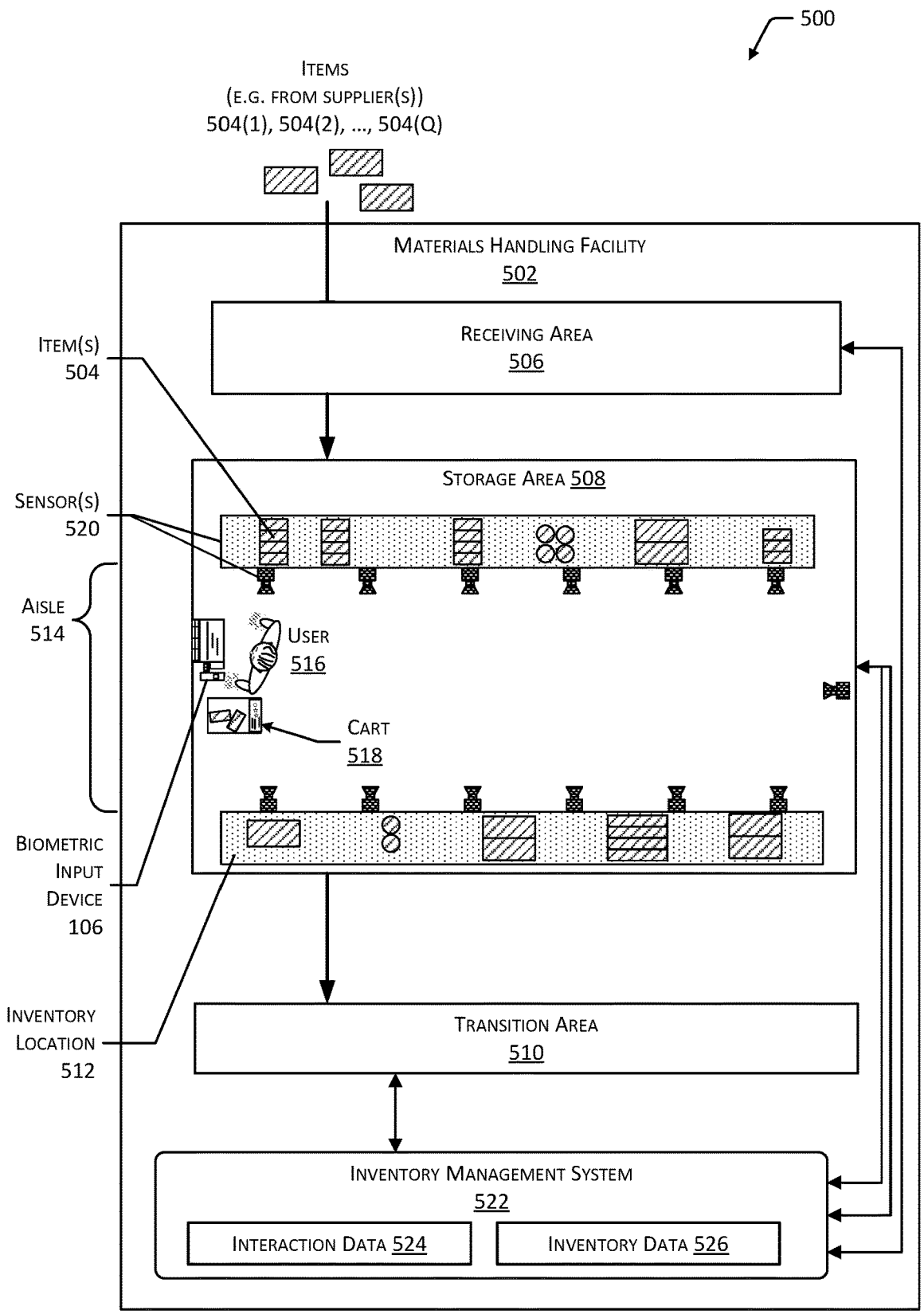
FIG. 5 is a block diagram illustrating a materials handling facility (facility) using the stateless secure payment system, according to some implementations.

FIG. 5 is a block diagram 500 illustrating a materials handling facility (facility) 502 using the system 100, according to some implementations. A facility 502 comprises one or more physical structures or areas within which one or more items 504(1), 504(2), . . . , 504(Q) may be held. As used in this disclosure, letters in parenthesis such as "(Q)" indicate an integer value greater than or equal to zero. The items 504 may comprise physical goods, such as books, pharmaceuticals, repair parts, electronic gear, and so forth.

The facility 502 may include one or more areas designated for different functions with regard to inventory handling. In this illustration, the facility 502 includes a receiving area 506, a storage area 508, and a transition area 510.

The facility 502 may be configured to receive different kinds of items 504 from various suppliers and to store them until a customer orders or retrieves one or more of the items 504. A general flow of items 504 through the facility 502 is indicated by the arrows of FIG. 5. Specifically, as illustrated in this example, items 504 may be received from one or more suppliers, such as manufacturers, distributors, wholesalers, and so forth, at the receiving area 506. In various implementations, the items 504 may include merchandise, commodities, perishables, or any suitable type of item 504, depending on the nature of the enterprise that operates the facility 502. Upon being received from a supplier at the receiving area 506, the items 504 may be prepared for storage in the storage area 508. For example, in some implementations, items 504 may be unpacked or otherwise rearranged. The receiving area 506 may be configured to accept items 504, such as from suppliers, for intake into the facility 502. For example, the receiving area 506 may include a loading dock at which trucks or other freight conveyances unload the items 504. After arriving through the receiving area 506, items 504 may be stored within the storage area 508. In some implementations, like items 504 may be stored or displayed together in the inventory locations 512 such as in bins, on shelves, hanging from pegboards, and so forth. In this implementation, all items 504 of a given kind are stored in one inventory location 512. In other implementations, like items 504 may be stored in different inventory locations 512. For example, to optimize retrieval of certain items 504 having frequent turnover within a large physical facility 502, those items 504 may be stored in several different inventory locations 512 to reduce congestion that might occur at a single inventory location 512.

In some implementations, the items 504 may be processed, such as at the receiving area 506, to generate item data. For example, an item 504 may be weighed, imaged or otherwise scanned to develop reference images or representations of the item 504 at the receiving area 506. In some implementations, the tag on the item 504 may be read to identify the type of item 504 during the receiving process. In one implementation, the items 504 may have the tags applied in the receiving area 506. In another implementation, the tags may be applied by the manufacturer of the item 504, at a transshipment point, and so forth, and the items 504 may arrive with the tags already applied.

The item data provides information about the characteristics of a particular type of item 504. These characteristics may include weight of the item 504 individually or in aggregate. For example, the item data may comprise information indicative of tag data associated with the item 504, a weight of a single item 504, or a package, kit, or other grouping considered to be a single item 504. Other information such as weight distribution may also be stored.

The tag data may include an item identifier. The item identifier may be used to distinguish one type of item 504 from another. For example, the item identifier may include a stock keeping unit (SKU) string, Universal Product Code (UPC) number, and so forth. The items 504 that are of the same type may be referred to by the same item identifier. For example, cans of beef flavor Brand X dog food may be represented by the item identifier value of "9811901181". In other implementations, non-fungible items 504 may each be provided with a unique item identifier, allowing each to be distinguished from one another.

The item data may include data about other characteristics, such as information about appearance for use in machine vision or manual recognition. For example, the item data may include sample images of the type of item 504, three-dimensional point cloud data for the item 530, and so forth. The sample image data may comprise one or more images of one or more of that type of item 504. For example, sample image data may be obtained during processing or intake of the item 504 to be used by the facility 502.

The item data may include other information about the appearance. For example, a plurality of local descriptor values may be generated by feature extraction algorithms, parameters for classifiers, neural network configuration data, and so forth, that characterizes the appearance of a representative of one or more of the item 504.

The item data may include one or more geometry data. The geometry data may include information indicative of size and shape of the item 504 in one, two, or three dimensions. For example, the geometry data may include the overall shape of an item 504, such as a cuboid, sphere, cylinder, and so forth. The geometry data may also include information such as length, width, depth, and so forth, of the item 504. Dimensional information in the geometry data may be measured in pixels, centimeters, inches, arbitrary units, and so forth. The geometry data may be for a single item 504, or a package, kit, or other grouping considered to be a single item 504.

The item data may indicate the types and quantities of items 504 that are expected to be stored at that particular inventory location 512 such as in a particular lane on a shelf. The item data may include one or more inventory location identifiers (IDs). The inventory location ID is indicative of a particular area or volume of an inventory location 512 such as a shelf that is designated for stowage of the type of item 504. For example, a single shelf may have several lanes, each with a different inventory location ID. Each of the different inventory location IDs may be associated with a lane having a particular area on the shelf designated for storage of a particular type of item 504. A single type of item 504 may be associated with a particular inventory location ID, a plurality of inventory location IDs may be associated with the single type of item 504, more than one type of item 504 may be associated with the particular inventory location ID, and so forth.

The storage area 508 is configured to store the items 504. The storage area 508 may be arranged in various physical configurations. In one implementation, the storage area 508 may include one or more aisles 514. The aisle 514 may be configured with, or defined by, inventory locations 512 on one or both sides of the aisle 514. The inventory locations 512 may include one or more of a shelf, a rack, a case, a cabinet, a bin, a floor location, or other suitable storage mechanisms for holding, supporting, or storing the items 504. For example, the inventory locations 512 may comprise shelves with lanes designated therein. The inventory locations 512 may be affixed to the floor or another portion of the structure of the facility 502. The inventory locations 514 may also be movable such that the arrangement of aisles 514 may be reconfigurable. In some implementations, the inventory locations 512 may be configured to move independently of an outside operator. For example, the inventory locations 512 may comprise a rack with a power source and a motor, operable by a computing device to allow the rack to move from one location within the facility 502 to another.

One or more users 516(1), 516(2), . . . , 516(U) and carts 518(1), 518(2), . . . , 518(T) or other material handling apparatus may move within the facility 502. For example, the user 516 may move about within the facility 502 to pick or place the items 504 in various inventory locations 512, placing them on the cart 518 for ease of transport. The cart 518 is configured to carry or otherwise transport one or more items 504. For example, the cart 518 may include a basket, bag, bin, and so forth. In some implementations, the cart 518 may include a camera 210. For example, as items 504 are placed into or removed from the cart 518, the camera 210 may be used to acquire the image data that is then used to read the tags and generate tag data. The tag data may then be used to determine the items 504 that are in the cart 518.

Other material handling apparatuses such as robots, forklifts, cranes, aerial drones, and so forth, may move about the facility 502 picking, placing, or otherwise moving the items 504. For example, a robot may pick an item 504 from a first inventory location 512(1) and move the item 504 to a second inventory location 512(2).

One or more sensors 520 may be configured to acquire information in the facility 502. The sensors 520 may include the camera 210 described above. Other sensors 520, such as cameras, weight sensors, and so forth may also be used. The sensors 520 may be stationary or mobile, relative to the facility 502. For example, the inventory locations 512 may contain weight sensors to acquire weight sensor data of items 504 stowed therein and detection systems to acquire images of picking or placement of items 504 on shelves, and so forth. In another example, the facility 502 may include cameras to obtain images of the user 516 or other objects in the facility 502. The sensors 520 are discussed in more detail below with regard to FIG. 6.

While the storage area 508 is depicted as having one or more aisles 514, inventory locations 512 storing the items 504, sensors 520, and so forth, it is understood that the receiving area 506, the transition area 510, or other areas of the facility 502 may be similarly equipped. Furthermore, the arrangement of the various areas within the facility 502 is depicted functionally rather than schematically. For example, in some implementations, multiple different receiving areas 506, storage areas 508, and transition areas 510 may be interspersed rather than segregated in the facility 502.

The facility 502 may include, or be coupled to, an inventory management system 522. The inventory management system 522 is configured to interact with users 516 or devices such as sensors 520, robots, material handling equipment, computing devices, and so forth, in one or more of the receiving area 506, the storage area 508, or the transition area 510.

During operation of the facility 502, the sensors 520 may be configured to provide sensor data, or information based on the sensor data, to the inventory management system 522. The sensor data may include tag data, image data, non-image data such as weight sensor data obtained from weight sensors, and so forth.

The inventory management system 522 or other systems may use the sensor data to track the location of objects within the facility 502, movement of the objects, or provide other functionality. Objects may include, but are not limited to, items 504, users 516, carts 518, and so forth. For example, a series of images acquired by a camera may indicate removal by the user 516 of an item 504 from a particular location on the inventory location 512 and placement of the item 504 on or at least partially within the cart 518. The item 504 may be identified by using the camera 210 to produce image data that is processed to determine the tag data indicative of the tags on the item 504. The resulting tag data may be used to determine the type of item 504 that was picked or placed at the inventory location 512.

The inventory management system 522 may include one or more software applications executing on a computer system to provide inventory management functions. These inventory management functions may include maintaining information indicative of the type, quantity, condition, cost, location, weight, or any other suitable parameters with respect to the items 504. The items 504 may be stocked, managed, or dispensed in terms of countable units, individual units, or multiple units, such as packages, cartons, crates, pallets, or other suitable aggregations. Alternatively, some items 504, such as bulk products, commodities, and so forth, may be stored in continuous or arbitrarily divisible amounts that may not be inherently organized into countable units. Such items 504 may be managed in terms of a measurable quantity such as units of length, area, volume, weight, time, duration, or other dimensional properties characterized by units of measurement. Generally speaking, a quantity of an item 504 may refer to either a countable number of individual or aggregate units of an item 504 or a measurable amount of an item 504, as appropriate.

When a customer order specifying one or more items 504 is received, or as a user 516 progresses through the facility 502, the corresponding items 504 may be selected or "picked" from the inventory locations 512 containing those items 504. In various implementations, item picking may range from manual to completely automated picking. For example, in one implementation, a user 516 may have a list of items 504 they desire and may progress through the facility 502 picking items 504 from inventory locations 512 within the storage area 508 and placing those items 504 into a cart 518. In other implementations, employees of the facility 502 may pick items 504 using written or electronic pick lists derived from customer orders. These picked items 504 may be placed into the cart 518 as the employee progresses through the facility 502.

After items 504 have been picked, the items 504 may be processed at a transition area 510. The transition area 510 may be any designated area within the facility 502 where items 504 are transitioned from one location to another or from one entity to another. For example, the transition area 510 may be a packing station within the facility 502. When the item 504 arrives at the transition area 510, the item 504 may be transitioned from the storage area 508 to the packing station. Information about the transition may be maintained by the inventory management system 522.

In another example, if the items 504 are departing the facility 502, a list of the items 504 may be obtained and used by the inventory management system 522 to transition responsibility for, or custody of, the items 522 from the facility 502 to another entity. For example, a carrier may accept the items 504 for transport with that carrier accepting responsibility for the items 504 indicated in the list. In another example, a user 516 may purchase or rent the items 504 and remove the items 504 from the facility 502. During use of the facility 502, the user 516 may move about the facility 502 to perform various tasks, such as picking or placing the items 504 in the inventory locations 512.

To facilitate operation of the facility 502, the inventory management system 522 is configured to use the sensor data including the tag data, weight sensor data, image data and other information such as the item data, physical layout data, and so forth, to generate interaction data 524.

The interaction data 524 may provide information about an interaction, such as a pick of an item 504 from the inventory location 512, a place of an item 504 to the inventory location 512, a touch made to an item 504 at the inventory location 512, a gesture associated with an item 504 at the inventory location 512, and so forth. The interaction data 524 may include one or more of the type of interaction, interaction location identifier indicative of where from the inventory location 512 the interaction took place, item identifier, quantity change to the item 504, user identifier, and so forth. The interaction data 524 may then be used to further update the inventory data 526. For example, the quantity of items 504 on hand at a particular lane on the shelf may be changed based on an interaction that picks or places one or more items 504.

The inventory management system 522 may combine or otherwise utilize data from different sensors 520 of different types. For example, tag data may be used in conjunction with weight data obtained from weight sensors at the inventory location 512 to determine the interaction data 524.

The inventory management system 522 may generate other data. In one implementation, user billing data may be generated that comprises a bill or invoice for the items 504 that have been taken into the custody of the user 516. For example, as the user 516 leaves the facility 502 with their cart 518, a list and cost associated with the purchase for those items 504 may be determined, taxes or other fees assessed, and that information included in the user billing data.

The inventory management system 522 may also maintain inventory data 526. For example, the inventory data 526 may comprise information such as quantity on hand at a particular inventory location 512, determine when to order additional items 504 for restock, and so forth.

In some implementations, the inventory management system 522 may use the tag data to direct the movement of items 504 within the facility 502. For example, the user 516 may be wearing an augmented reality headset that presents audible or visual information to the user 516. The system 100 may read the tags on the item 504 and generate tag data that identifies that item 504. The inventory management system 522 may use that tag data to determine that the item 504 is to be stowed in a particular inventory location 512. The inventory management system 522 may generate instructions to present prompts to the user 516 by way of the augmented reality headset, directing the user 516 to place the item 504 in the particular inventory location 512.

Figure 6:
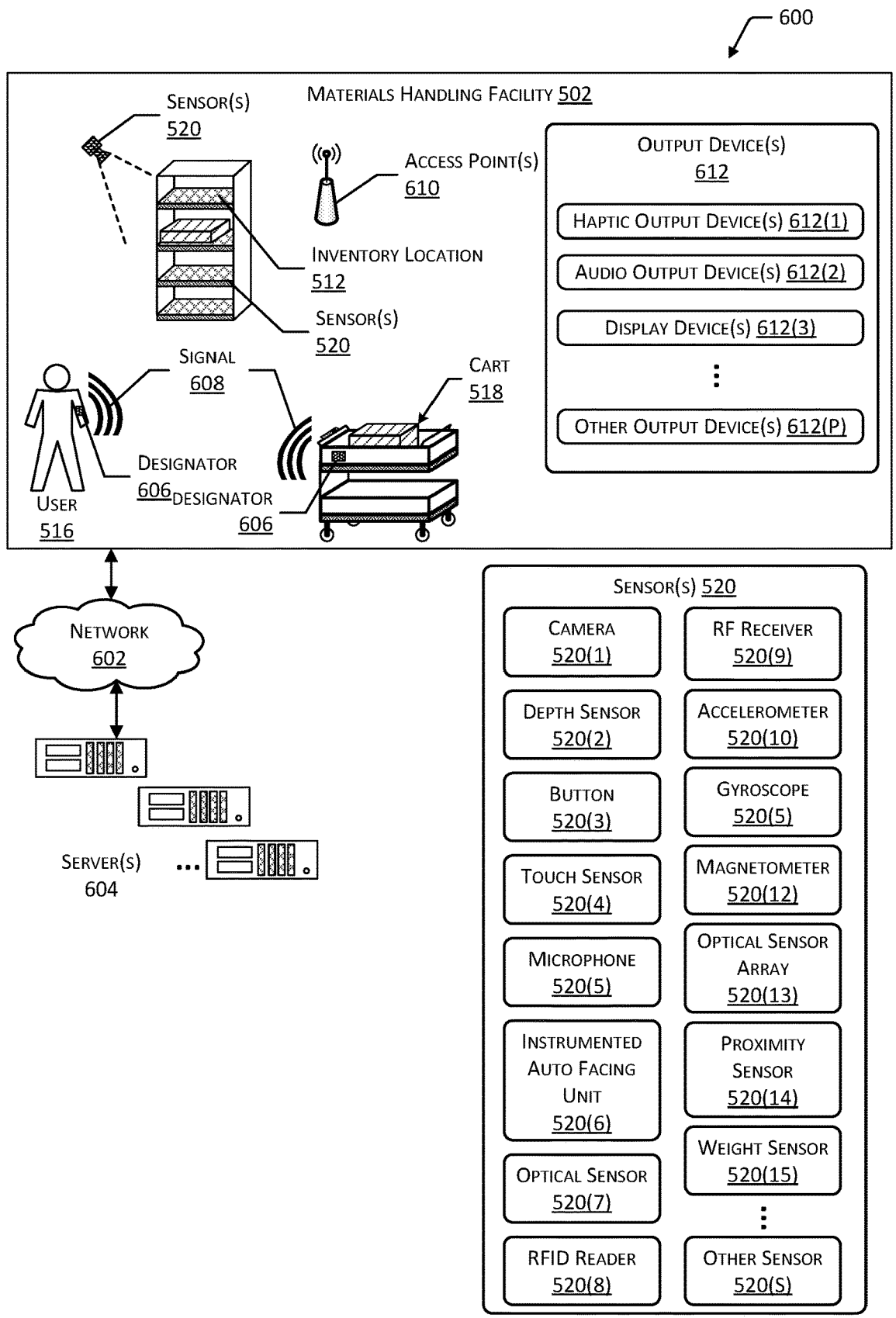
FIG. 6 is a block diagram illustrating additional details of the facility, according to some implementations.

FIG. 6 is a block diagram 600 illustrating additional details of the facility 502, according to some implementations. The facility 502 may be connected to one or more networks 602, which in turn connect to one or more servers 604. The network 602 may include private networks such as an institutional or personal intranet, public networks such as the Internet, or a combination thereof. The network 602 may utilize wired technologies (e.g., wires, fiber optic cables, and so forth), wireless technologies (e.g., radio frequency, infrared, acoustic, optical, and so forth), or other connection technologies. The network 602 is representative of any type of communication network, including one or more of data networks or voice networks. The network 602 may be implemented using wired infrastructure (e.g., copper cable, fiber optic cable, and so forth), a wireless infrastructure (e.g., cellular, microwave, satellite, and so forth), or other connection technologies.

The servers 604 may be configured to execute one or more modules or software applications associated with the inventory management system 522 or other systems. While the servers 604 are illustrated as being in a location outside of the facility 502, in other implementations, at least a portion of the servers 604 may be located at the facility 502. The servers 604 may include memory, processors, and so forth.

The users 516, the carts 518, or other objects in the facility 502 may be equipped with one or more designators 606. The designators 606 may be configured to emit a signal 608. In one implementation, the designator 606 may be a radio frequency identification (RFID) designator 606 configured to emit an RF signal 608 upon activation by an external signal. For example, the external signal may comprise a radio frequency signal or a magnetic field configured to energize or activate the RFID designator 606. In another implementation, the designator 606 may comprise a transmitter and a power source configured to power the transmitter. For example, the designator 606 may comprise a Bluetooth Low Energy (BLE) transmitter and battery. In other implementations, the designator 606 may use other techniques to indicate presence of the designator 606. For example, an acoustic designator 606 may be configured to generate an ultrasonic signal 608, which is detected by corresponding acoustic receivers. In yet another implementation, the designator 606 may be configured to emit an optical signal 608.

The inventory management system 522 may be configured to use the designators 606 for one or more of identification of the object, determining a location of the object, and so forth. For example, the users 516 may wear designators 606, the carts 518 may have designators 606 affixed, and so forth, which may be read and, based at least in part on signal strength, used to determine identity and location.

Generally, the inventory management system 522 or other systems associated with the facility 502 may include any number and combination of input components, output components, and servers 604.

The sensors 520 may include the camera 210 described above. During operation, the system may produce tag data that is used by the inventory management system 522. The one or more sensors 520 may be arranged at one or more locations within the facility 502. For example, the sensors 520 may be mounted on or within a floor, wall, at a ceiling, at an inventory location 512, on a cart 518, may be carried or worn by a user 516, and so forth.

The sensors 520 may include one or more cameras 520(1) or other imaging sensors. The one or more cameras 520(1) may include imaging sensors configured to acquire images of a scene. The cameras 520(1) are configured to detect light in one or more wavelengths including, but not limited to, terahertz, infrared, visible, ultraviolet, and so forth. The cameras 520(1) may comprise charge coupled devices (CCD), complementary metal oxide semiconductor (CMOS) devices, microbolometers, and so forth. The inventory management system 522 may use image data acquired by the cameras 520(1) during operation of the system 100 in the facility 502. For example, the inventory management system 522 may identify items 504, users 516, carts 518, and so forth, based at least in part on their appearance within the image data acquired by the cameras 520(1). The cameras 520(1) may be mounted in various locations within the facility 502. For example, cameras 520(1) may be mounted overhead, on inventory locations 512, may be worn or carried by users 516, may be affixed to carts 518, and so forth.

One or more depth sensors 520(2) may also be included in the sensors 520. The depth sensors 520(2) are configured to acquire spatial or three-dimensional (3D) data, such as depth information, about objects within a field of view (FOV). The depth sensors 520(2) may include range cameras, lidar systems, sonar systems, radar systems, structured light systems, stereo vision systems, optical interferometry systems, and so forth. The inventory management system 522 may use the 3D data acquired by the depth sensors 520(2) to identify objects, determine a location of an object in 3D real space, and so forth.

One or more buttons 520(3) may be configured to accept input from the user 516. The buttons 520(3) may comprise mechanical, capacitive, optical, or other mechanisms. For example, the buttons 520(3) may comprise mechanical switches configured to accept an applied force from a touch of the user 516 to generate an input signal. The inventory management system 522 may use data from the buttons 520(3) to receive information from the user 516. For example, the cart 518 may be configured with a button 520(3) to accept input from the user 516 and send information indicative of the input to the inventory management system 522.

The sensors 520 may include one or more touch sensors 520(4). The touch sensors 520(4) may use resistive, capacitive, surface capacitance, projected capacitance, mutual capacitance, optical, Interpolating Force-Sensitive Resistance (IFSR), or other mechanisms to determine the position of a touch or near-touch. For example, the IFSR may comprise a material configured to change electrical resistance responsive to an applied force. The location within the material of that change in electrical resistance may indicate the position of the touch. The inventory management system 522 may use data from the touch sensors 520(4) to receive information from the user 516. For example, the touch sensor 520(4) may be integrated with the cart 518 to provide a touchscreen with which the user 516 may select from a menu one or more particular items 504 for picking, enter a manual count of items 504 at an inventory location 512, and so forth.

One or more microphones 520(5) may be configured to acquire information indicative of sound present in the environment. In some implementations, arrays of microphones 520(5) may be used. These arrays may implement beamforming techniques to provide for directionality of gain. The inventory management system 522 may use the one or more microphones 520(5) to acquire information from acoustic designators 606, accept voice input from the users 516, determine ambient noise level, and so forth.

The sensors 520 may include instrumented auto facing units (IAFUs) 520(6). The IAFU 520(6) may comprise a position sensor configured to provide data indicative of displacement of a pusher. As an item 504 is removed from the IAFU 520(6), the pusher moves, such as under the influence of a spring, and pushes the remaining items 504 in the IAFU 520(6) to the front of the inventory location 512. By using data from the position sensor and given item data such as a depth of an individual item 504, a count may be determined, based on a change in position data. For example, if each item 504 is 1 inch deep, and the position data indicates a change of 6 inches, the quantity held by the IAFU 520(6) may have changed by 6 items 504. This count information may be used to confirm or provide a cross check for a count obtained by other means, such as analysis of the weight sensor data.

The sensors 520 may include one or more optical sensors 520(7). The optical sensors 520(7) may be configured to provide data indicative of one or more of color or intensity of light impinging thereupon. For example, the optical sensor 520(7) may comprise a photodiode and associated circuitry configured to generate a signal or data indicative of an incident flux of photons. As described below, the optical sensor array 520(13) may comprise a plurality of the optical sensors 520(7). The optical sensors 520(7) may include photodiodes, photoresistors, photovoltaic cells, quantum dot photoconductors, bolometers, pyroelectric infrared detectors, and so forth. For example, the optical sensor 520(7) may use germanium photodiodes to detect infrared light.

One or more radio frequency identification (RFID) readers 520(8), near field communication (NFC) systems, and so forth, may be included as sensors 520. For example, the RFID readers 520(8) may be configured to read the RF designators 606. Information acquired by the RFID reader 520(8) may be used by the inventory management system 522 to identify an object associated with the RF designator 606 such as the item 504, the user 516, the cart 518, and so forth. For example, based on information from the RFID readers 520(8) detecting the RF designator 606 at different times and RFID readers 520(8) having different locations in the facility 502, a velocity of the RF designator 606 may be determined.

One or more RF receivers 520(9) may also be included as sensors 520. In some implementations, the RF receivers 520(9) may be part of transceiver assemblies. The RF receivers 520(9) may be configured to acquire RF signals 608 associated with Wi-Fi, Bluetooth, ZigBee, 2G, 3G, 4G, LTE, or other wireless data transmission technologies. The RF receivers 520(9) may provide information associated with data transmitted via radio frequencies, signal strength of RF signals 608, and so forth. For example, information from the RF receivers 520(9) may be used by the inventory management system 522 to determine a location of an RF source, such as a communication interface onboard the cart 518.

The sensors 520 may include one or more accelerometers 520(10), which may be worn or carried by the user 516, mounted to the cart 518, and so forth. The accelerometers 520(10) may provide information such as the direction and magnitude of an imposed acceleration. Data such as rate of acceleration, determination of changes in direction, speed, and so forth, may be determined using the accelerometers 520(10).

A gyroscope 520(11) may provide information indicative of rotation of an object affixed thereto. For example, the cart 518 or other objects may be equipped with a gyroscope 520(11) to provide data indicative of a change in orientation of the object.

A magnetometer 520(12) may be used to determine an orientation by measuring ambient magnetic fields, such as the terrestrial magnetic field. The magnetometer 520(12) may be worn or carried by the user 516, mounted to the cart 518, and so forth. For example, the magnetometer 520(12) mounted to the cart 518 may act as a compass and provide information indicative of which direction the cart 518 is oriented.

An optical sensor array 520(13) may comprise one or optical sensors 520(7). The optical sensors 520(7) may be arranged in a regular, repeating, or periodic two-dimensional arrangement such as a grid. The optical sensor array 520(13) may generate image data. For example, the optical sensor array 520(13) may be arranged within or below an inventory location 512 and obtain information about shadows of items 504, hand 104 of the user 516, and so forth.

The sensors 520 may include proximity sensors 520(14) used to determine presence of an object, such as the user 516, the cart 518, and so forth. The proximity sensors 520(14) may use optical, electrical, ultrasonic, electromagnetic, or other techniques to determine presence of an object. In some implementations, the proximity sensors 520(14) may use an optical emitter and an optical detector to determine proximity. For example, an optical emitter may emit light, a portion of which may then be reflected by the object back to the optical detector to provide an indication that the object is proximate to the proximity sensor 520(14). In other implementations, the proximity sensors 520(14) may comprise a capacitive proximity sensor 520(14) configured to provide an electrical field and determine a change in electrical capacitance due to presence or absence of an object within the electrical field.

The proximity sensors 520(14) may be configured to provide sensor data indicative of one or more of presence or absence of an object, a distance to the object, or characteristics of the object. An optical proximity sensor 520(14) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using a sensor 520 such as a camera 520(1). Based on an apparent distance between the features of the structured light pattern, the distance to the object may be calculated. Other techniques may also be used to determine distance to the object. In another example, the color of the reflected light may be used to characterize the object, such as skin, clothing, cart 518, and so forth.

The one or more weight sensors 520(15) are configured to measure the weight of a load, such as the item 504, the cart 518, or other objects. The weight sensors 520(15) may be configured to measure the weight of the load at one or more of the inventory locations 512, the cart 518, on the floor of the facility 502, and so forth. For example, the shelf may include a plurality of lanes or platforms, with one or more weight sensors 520(15) beneath each one to provide weight sensor data about an individual lane or platform. The weight sensors 520(15) may include one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms of weight sensors 520(15) may operate as transducers that generate one or more signals based on an applied force, such as that of the load due to gravity. For example, the weight sensor 520(15) may comprise a load cell having a strain gauge and a structural member that deforms slightly when weight is applied. By measuring a change in the electrical characteristic of the strain gauge, such as capacitance or resistance, the weight may be determined. In another example, the weight sensor 520(15) may comprise a force sensing resistor (FSR). The FSR may comprise a resilient material that changes one or more electrical characteristics when compressed. For example, the electrical resistance of a particular portion of the FSR may decrease as the particular portion is compressed. The inventory management system 522 may use the data acquired by the weight sensors 520(15) to identify an object, determine a change in the quantity of objects, determine a location of an object, maintain shipping records, and so forth.

The sensors 520 may include other sensors 520(S) as well. For example, the other sensors 520(S) may include smart floors, light curtains, ultrasonic rangefinders, thermometers, barometric sensors, hygrometers, and so forth. For example, smart floors may utilize one or more of transmitters or receivers of electromagnetic signals positioned in or beneath a floor to determine one or more of location or identification of an object within the facility.

In some implementations, the camera 520(1) or other sensors 520(S) may include hardware processors, memory, and other elements configured to perform various functions. For example, the cameras 520(1) may be configured to generate image data, send the image data to another device, and so forth.

The facility 502 may include one or more access points 610 configured to establish one or more wireless networks. The access points 610 may use Wi-Fi, NFC, Bluetooth, or other technologies to establish wireless communications between a device and the network 602. The wireless networks allow the devices to communicate with one or more of the sensors 520, the inventory management system 522, the designator 606, a communication device of the cart 518, or other devices.

Output devices 612 may also be provided in the facility 502. The output devices 612 are configured to generate signals, which may be perceived by the user 516 or detected by the sensors 520.

Haptic output devices 612(1) are configured to provide a signal that results in a tactile sensation to the user 516. The haptic output devices 612(1) may use one or more mechanisms such as electrical stimulation or mechanical displacement to provide the signal. For example, the haptic output devices 612(1) may be configured to generate a modulated electrical signal, which produces an apparent tactile sensation in one or more fingers of the user 516. In another example, the haptic output devices 612(1) may comprise piezoelectric or rotary motor devices configured to provide a vibration, which may be felt by the user 516.

One or more audio output devices 612(2) may be configured to provide acoustic output. The acoustic output includes one or more of infrasonic sound, audible sound, or ultrasonic sound. The audio output devices 612(2) may use one or more mechanisms to generate the acoustic output. These mechanisms may include, but are not limited to, the following: voice coils, piezoelectric elements, magnetostrictive elements, electrostatic elements, and so forth. For example, a piezoelectric buzzer or a speaker may be used to provide acoustic output.

The display devices 612(3) may be configured to provide output, which may be seen by the user 516 or detected by a light-sensitive sensor such as a camera 520(1) or an optical sensor 520(7). In some implementations, the display devices 612(3) may be configured to produce output in one or more of infrared, visible, or ultraviolet light. The output may be monochrome or in color. The display devices 612(3) may be one or more of emissive, reflective, microelectromechanical, and so forth. An emissive display device 612(3), such as using LEDs, is configured to emit light during operation. In comparison, a reflective display device 612(3), such as using an electrophoretic element, relies on ambient light to present an image. Backlights or front lights may be used to illuminate non-emissive display devices 612(3) to provide visibility of the output in conditions where the ambient light levels are low.

The display devices 612(3) may be located at various points within the facility 502. For example, the addressable displays may be located on inventory locations 512, carts 518, on the floor of the facility 502, and so forth.

Other output devices 612(P) may also be present. For example, the other output devices 612(P) may include scent/odor dispensers, document printers, 3D printers or fabrication equipment, and so forth.

The processes discussed herein may be implemented in hardware, software, or a combination thereof. In the context of software, the described operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:
1. A device comprising:
a first communication interface;
a biometric input device;
a first memory storing first computer-executable instructions;
a first hardware processor to execute the first computer-executable instructions to:
determine, using the biometric input device, biometric data;
send the biometric data using the first communication interface, wherein the biometric data is used to determine encrypted data; and
receive, using the first communication interface, the encrypted data; and a secure execution environment comprising:
  a second communication interface;
  a second memory storing second computer-executable instructions and a private key; and
  a second hardware processor to execute the second computer-executable instructions to:
    receive an encrypted installation file comprising one or more instructions;
    access the private key that is stored in the second memory;
    decrypt the encrypted installation file using the private key to produce a decrypted installation file;
    instantiate a contactless payment application using the decrypted installation file;
    access the encrypted data;
    decrypt, using the private key, the encrypted data to provide one or more host card emulation (HCE) parameters;
    configure the contactless payment application based at least in part on the one or more HCE parameters;
    perform, using the second communication interface and the contactless payment application, a transaction with a payment terminal; and
    erase the encrypted data and the one or more HCE parameters.

2. The device of claim 1, wherein the biometric input device comprising one or more of:
  a camera,
  a fingerprint sensor, or
  a microphone.

3. The device of claim 1, wherein the private key is unique to the secure execution environment.

4. The device of claim 1, wherein the second hardware processor to further execute the second computer-executable instructions to:
  send to the payment terminal one or more application protocol data unit commands that are compliant with at least a portion of the ISO/IEC 7816 standard as promulgated by the International Organization for Standardization (ISO).

5. A method comprising:
  instantiating an application within a secure execution environment;
  acquiring biometric data using one or more biometric input devices;
  sending at least a portion of the biometric data to a first device, wherein the biometric data is used to determine encrypted data;
  receiving the encrypted data from the first device;
  decrypting, within the secure execution environment, the encrypted data to provide one or more host card emulation (HCE) parameters;
  configuring the application based at least in part on the one or more HCE parameters;
  performing, using the application executing in the secure execution environment, a transaction with a second device; and
  erasing the encrypted data and the one or more HCE parameters after the transaction is complete.

6. The method of claim 5, wherein the one or more HCE parameters comprise data indicative of one or more of:
  an application primary account number,
  a cardholder name,
  an application expiration date, or
  an application primary account number sequence number.

7. The method of claim 5, further comprising:
  receiving an installation file comprising one or more instructions;
  determining a digital signature of the installation file is valid; and
  wherein the instantiating the application uses the installation file.

8. The method of claim 5, further comprising:
  receiving an encrypted installation file comprising one or more instructions;
  accessing, within the secure execution environment, a private key that is stored in the secure execution environment;
  decrypting the encrypted installation file using the private key to produce a decrypted installation file; and
  wherein the instantiating the application uses the decrypted installation file.

9. The method of claim 5, further comprising:
  accessing, within the secure execution environment, a private key that is stored in the secure execution environment; and
  wherein the decrypting the encrypted data uses the private key.

10. The method of claim 5, wherein the application is compliant with at least a portion of the ISO/IEC 14443 standard as promulgated by the International Organization for Standardization (ISO).

11. The method of claim 5, wherein the performing the transaction comprises:
  sending, to the second device, one or more application protocol data unit commands that are compliant with at least a portion of the ISO/IEC 7816 standard as promulgated by the International Organization for Standardization (ISO).

12. The method of claim 5, further comprising:
  determining data indicative of physical or electronic tampering; and
  erasing contents stored in the secure execution environment.

13. A system comprising:
  a first communication interface;
  a second communication interface;
  a first memory storing first computer-executable instructions;
  a first hardware processor to execute the first computer-executable instructions to:
    determine, using a biometric input device, biometric data that is indicative of one or more of one or more features of a user;
    send the biometric data using the first communication interface, and wherein the biometric data is used to determine encrypted data;
    receive, using the first communication interface, the encrypted data;
    send, using the second communication interface, the encrypted data to a secure execution environment; and
  the secure execution environment comprising:
    a third communication interface that is in communication with the second communication interface;
    a fourth communication interface;
    a second memory storing second computer-executable instructions and a private key;

a second hardware processor to execute the second computer-executable instructions to:
  access the encrypted data;
  decrypt, using the private key, the encrypted data to provide one or more host card emulation (HCE) parameters;
  instantiate an instance of an application using the one or more HCE parameters;
  perform, using the fourth communication interface and the instance of the application, a transaction with an external device; and
  erase the instance of the application, the encrypted data, and the one or more HCE parameters.

14. The system of claim 13, further comprising:
the biometric input device comprising one or more of:
  a camera, a fingerprint sensor, or a microphone; and
  a controller to generate biometric data.

15. The system of claim 13, wherein the one or more HCE parameters comprise data indicative of one or more of:
  an application primary account number,
  a cardholder name,
  an application expiration date, or
  an application primary account number sequence number.

16. The system of claim 13, wherein the application comprises a contactless payment application that is compliant with at least a portion of the ISO/IEC 14443 standard as promulgated by the International Organization for Standardization (ISO).

17. The system of claim 13, wherein the second hardware processor to further execute the second computer-executable instructions to:
  receive an installation file comprising one or more instructions;
  determine a digital signature of the installation file is valid; and
  wherein the instantiation of the instance of the application uses the installation file.

18. The system of claim 13, wherein the second hardware processor to further execute the second computer-executable instructions to:
  receive encrypted installation data comprising one or more instructions;
  decrypt the encrypted installation data using the private key to produce decrypted installation data; and
  wherein the instantiation of the instance of the application uses the decrypted installation data.

19. The system of claim 13, wherein the private key is unique to the secure execution environment.

20. The system of claim 13, wherein the secure execution environment further comprises:
  one or more tamper detection devices; and
  the second hardware processor to execute the second computer-executable instructions to:
    responsive to output from the one or more tamper detection devices:
      disable the third communication interface,
      disable the fourth communication interface,
      erase contents of the second memory, or
      disable the second hardware processor.

21. A method comprising:
  instantiating, at a first device, an application within a secure execution environment of the first device;
  acquiring, at a biometric input device, biometric data;
  sending, from the biometric input device, the biometric data to a second device, wherein the biometric data is used to determine encrypted data;
  receiving, at the first device, the determined encrypted data from the second device;
  decrypting, within the secure execution environment of the first device, the encrypted data to provide one or more host card emulation (HCE) parameters;
  configuring, at the first device, the application based at least in part on the one or more HCE parameters;
  performing, using the application executing in the secure execution environment of the first device, a transaction with a third device; and
  erasing, at the first device, the encrypted data and the one or more HCE parameters after the transaction is complete.

* * * * *